United States Patent
Sween et al.

(10) Patent No.: US 7,242,577 B2
(45) Date of Patent: Jul. 10, 2007

(54) CPU CARRYING CART WITH UNINTERRUPTIBLE POWER SUPPLY

(75) Inventors: Barry Sween, Santa Monica, CA (US); Yoko Iida, Los Angeles, CA (US)

(73) Assignee: Belkin International, Inc., Compton, CA (US)

( * ) Notice: Subject to any disclaimer, the term of this patent is extended or adjusted under 35 U.S.C. 154(b) by 113 days.

(21) Appl. No.: 11/147,683

(22) Filed: Jun. 8, 2005

(65) Prior Publication Data
US 2006/0279917 A1    Dec. 14, 2006

(51) Int. Cl.
*G06F 1/16* (2006.01)
(52) U.S. Cl. ........... 361/683; 361/679; 312/223.2; 312/283; 108/147; 280/47.34
(58) Field of Classification Search ........ 361/683, 361/679, 680–682; 312/223.1–223.6, 197, 312/208, 283, 310, 302, 308, 249.8, 244, 312/114, 249.11, 249.12; 108/139, 140, 108/50.14, 3, 50.02, 25, 147; 606/32; 280/47.34, 280/47.35, 35, 651
See application file for complete search history.

(56) References Cited

U.S. PATENT DOCUMENTS

| | | | | |
|---|---|---|---|---|
| 6,008,621 A | * | 12/1999 | Madison et al. | 320/107 |
| 6,112,989 A | * | 9/2000 | Sheldon | 235/384 |
| 6,206,495 B1 | * | 3/2001 | Peterson | 312/283 |
| 6,493,217 B1 | * | 12/2002 | Jenkins, Jr. | 361/683 |
| 7,055,833 B2 | * | 6/2006 | Wixted et al. | 280/47.34 |
| 7,130,190 B1 | * | 10/2006 | Baker | 361/695 |

* cited by examiner

*Primary Examiner*—Michael Datskovskiy
(74) *Attorney, Agent, or Firm*—Bryan Cave LLP

(57) ABSTRACT

A CPU cart is provided for easily moving a vertical or tower configuration CPU and integrating a UPS. In one preferred embodiment of the invention, the CPU cart includes a generally planar rectangular shaped base for receiving the CPU and four wheels located under the base for moving the cart and CPU. The cart includes a UPS and at least one compartment for enclosing at least a portion of the UPS, as well as providing support for the cart and preventing the CPU from falling off the cart. If desired the UPS can also be integrated with a surge protector.

13 Claims, 3 Drawing Sheets

CPU CARRYING CART WITH UNINTERRUPTIBLE POWER SUPPLY

FIELD OF THE INVENTION

This invention relates generally to a CPU carrying cart with an uninterruptible power supply (UPS).

BACKGROUND OF THE INVENTION

Central processing units (CPUs) designed in the vertical or tower configuration are frequently utilized. These units occupy significantly less desk space than do horizontally oriented CPUs and may also be positioned on the floor. In the tower configuration, the various CPU switches, connections and slots are typically located on the rear panel of the CPU. Accordingly, it is often difficult to access the CPU switches, connections and slots. Additionally, CPUs in a tower configuration may interfere with routine floor cleaning. Further, contrary to certain laptop computers that can be used under certain circumstances in a wireless form, CPUs in the tower configuration, utilize a number of cables, plugs and frequently an external UPS and/or surge protector.

A CPU and other related components typically receive 110 or 120 volts of AC power oscillating at 60 Hertz. Although a CPU and its components can typically tolerate slight differences from this specification, a significant deviation can cause the CPU's power supply to fail. In order to prevent such failure, a UPS is commonly used to protect a CPU against voltage surges and spikes, voltage sags, total power failure and frequency differences.

There are two common UPS systems in use today: standby UPS and continuous UPS. A standby UPS powers the CPU from normal utility power until it detects an irregularity. At that point, the UPS quickly turns on a power inverter and powers the computer from the UPS's battery. A power inverter in the UPS converts the DC power delivered by the battery into 120-volt, 60-Hertz AC power.

In a continuous UPS, the CPU is continuously powered by the battery, and the battery is continuously being recharged. The battery charger continuously produces DC power, which the inverter continuously converts to into 120-volt AC power. If the power fails, the battery provides power to the inverter. There is no switch-over time in a continuous UPS, thus providing a very stable source of power.

Accordingly, there exists a need for a CPU carrying cart that provides a mechanism for easily moving a tower CPU, incorporates a UPS, and also incorporates at least one compartment for housing at least a portion of the UPS.

SUMMARY

The present invention is a carrying cart for a vertical or tower configuration CPU. The cart includes a substantially planar base for supporting the CPU and four wheels attached to the bottom surface of the base to make the cart movable. The cart is integrated with an uninterruptible power supply (UPS) having multiple AC outlets, at least one back-up battery unit and, if desired, a surge protector. The UPS can power the CPU and other components at once and protect against voltage surges and spikes, voltage sags, total power failure and frequency differences.

In one preferred embodiment of the invention, the cart is also integrated with at least one compartment for housing at least a portion of the UPS.

In another preferred embodiment, the cart is integrated with two compartments, located on either side of the cart to allow the CPU to fit between the two compartments. In this embodiment, the compartments provide additional stability to the cart and also assist in securing the CPU to the cart.

In another preferred embodiment of the invention, the UPS is integrated with a surge protector, for example a "smart" surge protector, such as the ENERGY EFFICIENT SURGE™, that shuts down all components plugged into the surge protector shortly after the CPU is turned off.

In another preferred embodiment of the invention, the carrying cart is integrated with at least one additional outlet located on the outside surface of at least one of the compartments.

BRIEF DESCRIPTION OF THE DRAWINGS

The invention will be better understood from a reading of the following detailed description, taken in conjunction with the accompanying figures in the drawings in which.

Figure 1:
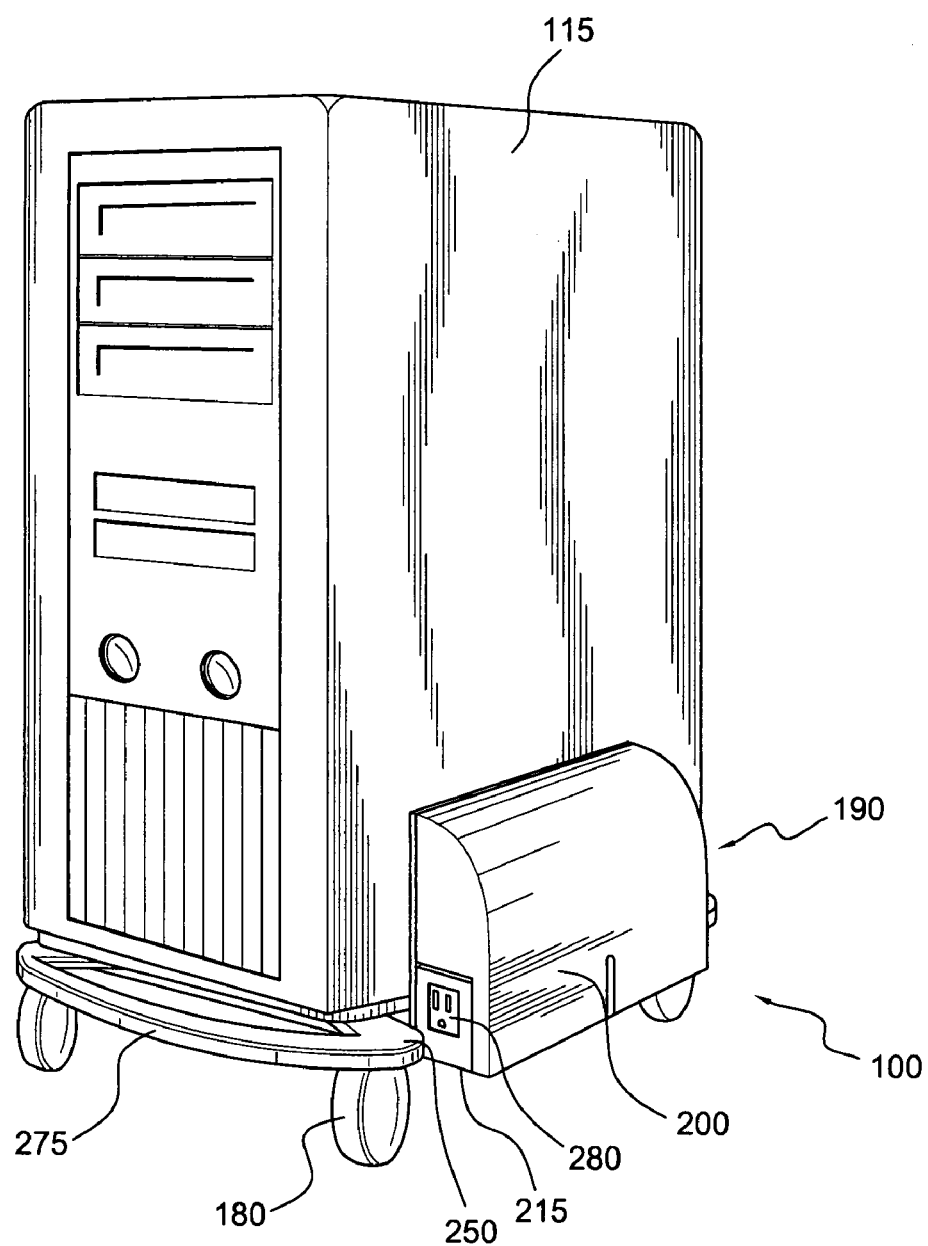
FIG. 1 is an illustration of a CPU positioned on a CPU cart according to a preferred embodiment of the invention.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical, mechanical, or other manner.

DETAILED DESCRIPTION OF THE DRAWINGS

Figure 2:
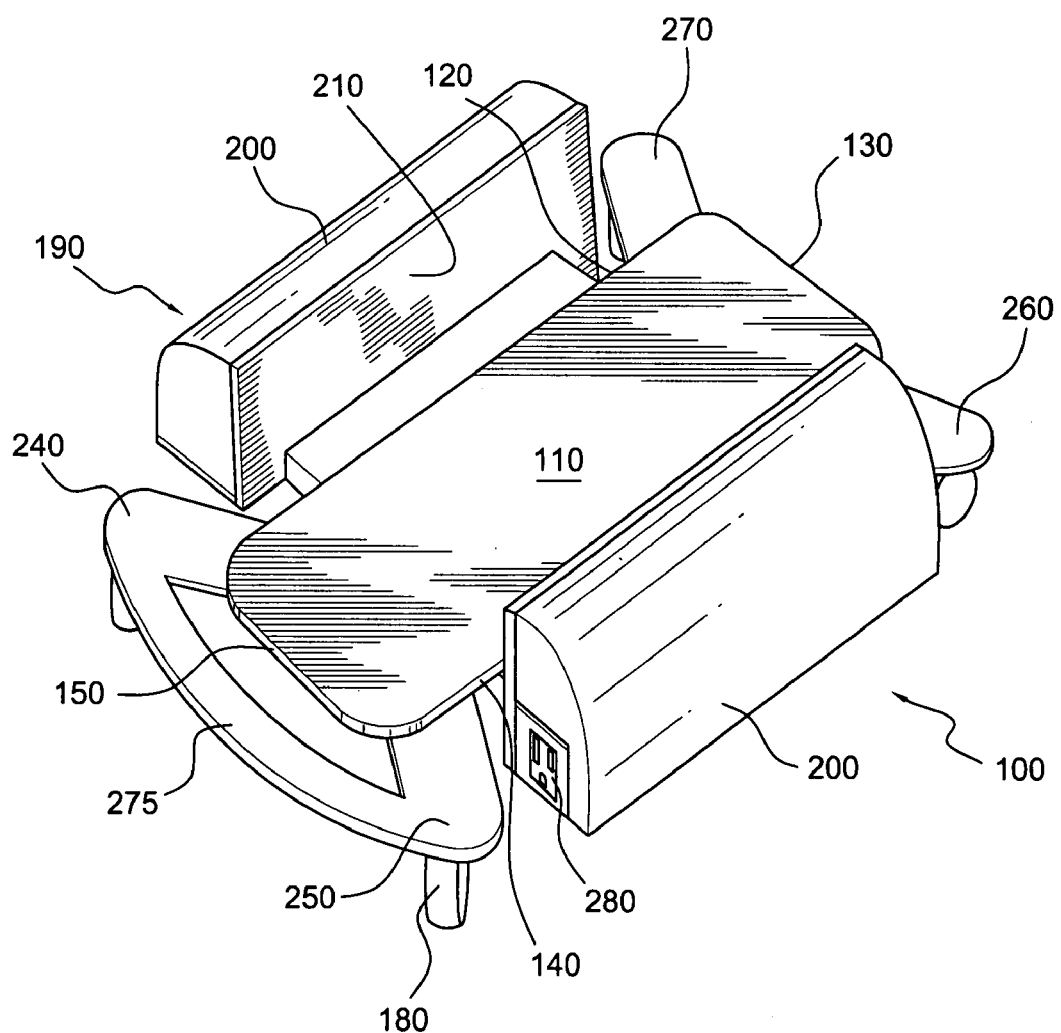
FIG. 2 is an illustration of the CPU cart according to a preferred embodiment of the invention.
Figure 3:
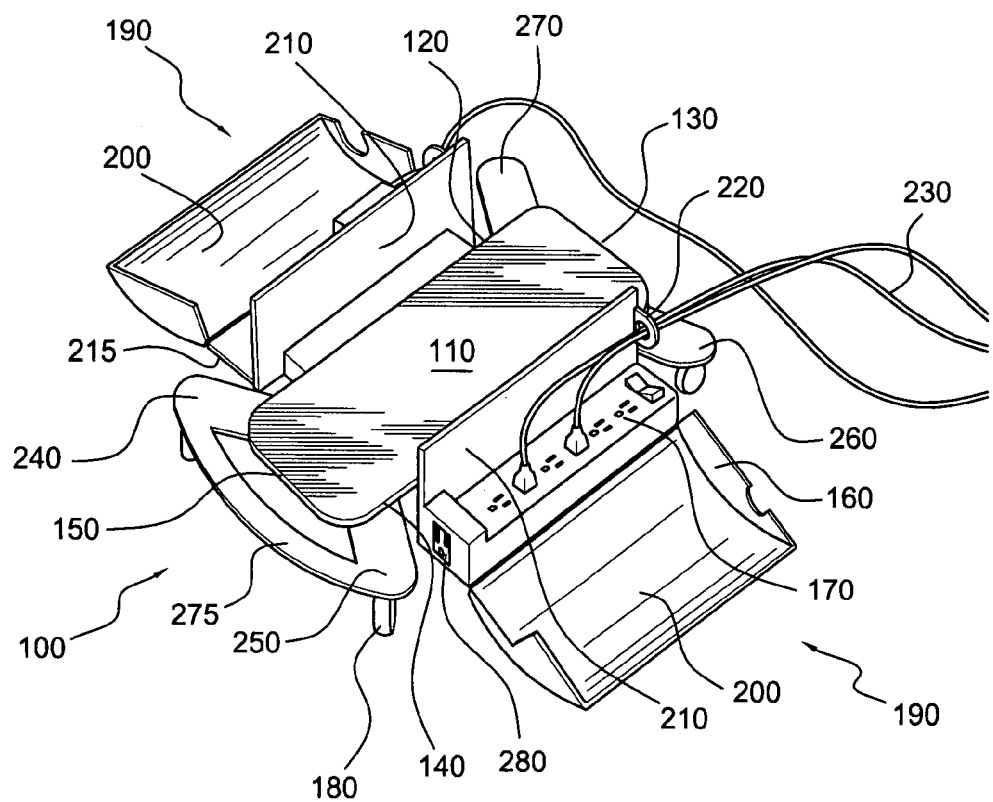
FIG. 3 is an illustration of the CPU cart according to a preferred embodiment of the invention.

Referring to FIGS. 1, 2 and 3, one preferred embodiment of the present invention is illustrated. As shown in FIG. 2, in this embodiment of the invention, the CPU cart 100 comprises a generally planar base 110 for receiving a vertical or tower configuration CPU 115. The base 110 comprises first 120, second 130, third 140 and fourth edges 150. The first edge 120 and third edge 140 are generally parallel and longer than the second edge 130 and fourth edge 150. The second edge 130 and fourth edge 150 are generally parallel and shorter than the first edge 120 and third edge 140. The first 120, second 130, third 140 and fourth edges 150, together are generally in the shape of a rectangle.

The cart 100 is integrated with an uninterruptible power supply (UPS) 160 having multiple AC outlets 170, although not visible in the figures, at least one back-up battery unit and, if desired, a surge protector. The UPS 160 can power the CPU 115 and other components at once and protect against voltage surges and spikes, voltage sags, total power failure and frequency differences. In one preferred embodiment, the back-up battery unit is located underneath the base 110.

The cart 100 is equipped with wheels 180 for moving the cart. The wheels 180 are attached to the bottom surface of the base 110. The wheels 180 are preferably pivotally and rotatably mounted on the base for maximum mobility. In one preferred embodiment one wheel 180 is attached near each corner of the rectangular shaped base 110.

As illustrated in FIGS. 1–3, the cart is also integrated with at least one compartment 190 for housing at least a portion of a UPS 160. The compartment 190 is preferably located along the first edge 120 or third edge 140 of the base 110.

In another preferred embodiment, the CPU cart comprises two compartments, adjacent to both the first edge 120 and third edge 140 of the base 110. In this embodiment, the CPU 115 can be inserted between the two compartments 190. The two compartments 190 provide support for the CPU 115, retain the CPU 115 on the base 110 and provide the greater stability for the cart 100.

The compartments 190 can be created to be completely integral with the cart 110 or can be constructed separately and affixed to the cart 110 by any mechanism that is known to one skilled in the art, such as by using fasteners, screws, adhesives or combinations. Alternatively, the compartments 190 can be affixed to the base 110 of the cart 100 using a resilient interference-type snap fit.

In one preferred embodiment of the invention, the compartment 190 can be closed and at least a portion of the UPS 160 concealed with a cover 200 that is hingedly attached to the remainder of the compartment 190. Alternatively, in another preferred embodiment, the cover 200 can be attached directly to the UPS 160 housing. In another embodiment, the cover 200 is attached directly to the UPS 160 housing and the compartment 190 is also equipped with a side panel 210 that is adjacent to either the first edge 120 or third edge 140 of the base 110. The side panel 210 provides a partition between the CPU 115 and the remainder of the UPS compartment 190.

In one preferred embodiment the cover of the compartment 190 is angled so that the entire compartment 190 comprises three surfaces, the cover 200 surface, the side panel 210 surface and the bottom surface 215.

In one preferred embodiment of the invention, the cover 200 can be fastened to the remainder of the compartment 190 using a closure mechanism, including but not limited to a resilient interference-type snap fit or a locking mechanism. When the compartment is equipped with a cover 200 for concealing at least a portion of the UPS 160, the compartment is also preferable equipped with an opening 220 to permit cords 230 from the CPU 115 or other components to be fed from the CPU 115 or other external source to the outlets 170 located within the UPS compartment 190.

In another preferred embodiment the portion of the UPS 160 immediately accessible when opening the compartment cover 200 is a power strip with multiple outlets 170. If the cart 100 is equipped with two compartments 190, each compartment 190 can house differently spaced outlets 170. For example, one compartment 190 can house outlets 170 that are spaced apart to receive typical AC power plugs, while the second compartment 190 can house block-spaced outlets that are sufficiently spaced apart and suitable for powering and protecting CPUs 115 or other devices that are connected to larger AC adapter blocks.

As illustrated in FIG. 1–FIG. 3, in another preferred embodiment, the base 110 can be integrated with first 240, second 250, third 260 and fourth 270 leg extensions located near each corner of the base 110. In this embodiment a wheel 180 can be attached under each base flange. The flanges serve to provide additional stability to the CPU cart 100 and allow the wheels 180 to easily rotate in 360 degrees without interfering with the cart 100 or the UPS 160. Such embodiment is particularly useful if at least a portion of the UPS 160 is mounted under the base 110. The leg extensions are not limited to one particular type of structure, but can take on different forms. For example, two of the extensions, as illustrated in FIG. 1–FIG. 3, the first leg extension 240 and second leg extension 250 can be connected to form a handle 275.

Although not visible in the figures, in one preferred embodiment of the invention, the UPS 160 comprises at least one additional battery back up unit. The battery back-up unit is preferably mounted under the base 110.

In another preferred embodiment of the invention, the UPS 160 is integrated with a surge protector, for example, a "smart" surge protector, such as the ENERGY EFFICIENT SURGE™, which shuts down all components plugged into the surge protector shortly after the CPU is turned off.

In another preferred embodiment of the invention, the cart 100 is integrated with at least one additional outlet 280 located on the exterior surface of at least one of the compartments 190.

The CPU cart 100 of the present invention provides a convenient mechanism for easily moving a tower CPU 115 and incorporates a UPS 160 that can be housed in at least one compartment 190. Thus, in one aspect, the present invention provides, the cart 100 comprises a generally planar base 110 or receiving the CPU 115. The base 110 has four edges, described herein as first 120, second 130, third 140 and fourth 150 edges. The first edge 120 and third edge 140 are generally parallel and longer than the second edge 130 and fourth edge 150. The second edge 130 and fourth edge 150 are generally parallel and shorter than the first edge 120 and third edge 140. Accordingly, the four edges together are generally in the shape of a rectangle. The CPU cart also comprises at least one compartment 190 that is located along either the first edge 120 or third edge 140 and encloses at least a portion of a UPS 160. The CPU cart 100 also includes at least three wheels 180 located under the base 110 for moving the cart 100.

Although the invention has been described with reference to specific embodiments, it will be understood by those skilled in the art that various changes may be made without departing from the spirit or scope of the invention. Various examples of such changes have been given in the foregoing description. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the charging station discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A central processing unit cart for supporting and moving a central processing unit, said cart comprising:
    a generally rectangular planar base for receiving the central processing unit;
    an uninterruptible power supply;
    a compartment adjacent the base for enclosing at least a portion of the uninterruptible power supply; and
    at least three wheels secured to the base,
    wherein:
    the uninterruptible power supply is at least partially housed within the compartment and comprises outlets for providing regulated power to the central processing unit.

2. The cart of claim 1 wherein the uninterruptible power supply further comprises a surge protector.

3. The cart of claim 1 wherein at least a portion of the uninterruptible power supply is located under the base.

4. The cart of claim 1 wherein the compartment comprises an exterior surface and an outlet located on the external surface.

5. The cart of claim 1 wherein the base comprises four corners and four leg extensions extending from each corner away from the base.

6. The cart of claim 5 wherein the cart comprises four wheels and each wheel is attached to one of the leg extensions.

7. A central processing unit cart for allowing a central processing unit to be easily moved, said cart comprising:
    a generally rectangular planar base for receiving the central processing unit;
    an uninterruptible power supply;
    a first and second compartment, said compartments adjacent the base, said compartments enclose at least a portion of the uninterruptible power supply; and
    at least three wheels secured to the base,
    wherein:
    the uninterruptible power supply is at least partially housed within the compartment and comprises outlets for providing regulated power to the central processing unit.

8. The cart of claim 7 wherein the uninterruptible power supply further comprises a surge protector.

9. The cart of claim 7 wherein at least a portion of the uninterruptible power supply is located under the base.

10. The cart of claim 7 wherein the compartment comprises an exterior surface and an outlet located on the external surface.

11. The cart of claim 7 wherein the base comprises four corners and four leg extensions extending from each corner away from the base.

12. The cart of claim 11 wherein the cart comprises four wheels and each wheel is attached to one of the leg extensions.

13. The cart of claim 7 wherein at least one compartment encloses a plurality of outlets that are spaced apart to receive larger AC adapter blocks.

* * * * *